(12) United States Patent
He et al.

(10) Patent No.: US 11,919,162 B2
(45) Date of Patent: Mar. 5, 2024

(54) ID NUMBER SETTING METHOD, COMPUTER-READABLE STORAGE MEDIUM AND MODULAR DEVICE

(71) Applicant: UBTECH ROBOTICS CORP LTD, Shenzhen (CN)

(72) Inventors: Wei He, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 496 days.

(21) Appl. No.: 17/134,155

(22) Filed: Dec. 24, 2020

(65) Prior Publication Data
US 2021/0197372 A1 Jul. 1, 2021

(30) Foreign Application Priority Data
Dec. 28, 2019 (CN) .......................... 201911384787.5

(51) Int. Cl.
*G06F 13/40* (2006.01)
*A63H 33/04* (2006.01)
*B25J 9/16* (2006.01)

(52) U.S. Cl.
CPC ............ *B25J 9/1617* (2013.01); *A63H 33/04* (2013.01); *G06F 13/4068* (2013.01); *G05B 2219/40304* (2013.01)

(58) Field of Classification Search
CPC ................ G06F 13/4068; B25J 9/1617; G05B 2219/40304

USPC ......................................................... 710/303
See application file for complete search history.

(56) References Cited

U.S. PATENT DOCUMENTS

| | | | |
|---|---|---|---|
| 10,188,939 B2 * | 1/2019 | Zhang ................... | A63H 33/042 |
| 11,229,841 B2 * | 1/2022 | Son ........................ | A63F 13/215 |
| 11,541,322 B1 * | 1/2023 | Aalund ................. | A63H 33/046 |
| 11,616,844 B2 * | 3/2023 | Bdeir ...................... | H04L 41/22 |
| | | | 370/254 |
| 2016/0101370 A1 * | 4/2016 | Madsen ................. | A63H 33/04 |
| | | | 446/91 |
| 2017/0220512 A1 * | 8/2017 | Lin ........................ | G06F 1/3287 |
| 2018/0088546 A1 * | 3/2018 | Kim ........................ | B25J 9/1605 |
| 2018/0280822 A1 * | 10/2018 | Murthy ................ | A63H 33/042 |
| 2019/0190193 A1 * | 6/2019 | Bdeir .................. | H01R 13/6205 |
| 2020/0006815 A1 * | 1/2020 | Hwang ................ | H01M 10/425 |
| 2020/0200828 A1 * | 6/2020 | Sung ...................... | B60L 53/12 |

* cited by examiner

*Primary Examiner* — Christopher B Shin (57) ABSTRACT

An identification (ID) number setting method for a modular device that comprises a master building element and a plurality of slave building elements that are connected to the master building element, includes: disconnecting the slave building elements from the master building element; setting ID numbers of all of the slave building elements to be a preset ID number; and assigning new ID numbers to slave building elements of N tiers that are connected to one output interface of the master building element in an order from first tier to Nth tier, wherein the slave building elements of the first tier are slave building elements that are directly connected to the output interface, the slave building elements of the Nth tier are slave building elements that are indirectly connected to the output interface through slave building elements of a (N−1)th tier, N is a natural number greater than 1.

17 Claims, 9 Drawing Sheets

ID NUMBER SETTING METHOD, COMPUTER-READABLE STORAGE MEDIUM AND MODULAR DEVICE

CROSS REFERENCE TO RELATED APPLICATIONS

This application claims priority to Chinese Patent Application No. 201911384787.5, filed Dec. 28, 2019, which is hereby incorporated by reference herein as if set forth in its entirety.

BACKGROUND

1. Technical Field

The present disclosure generally relates to modular devices, and particularly to an ID number setting method for a modular device.

2. Description of Related Art

Modular devices (e.g., modular robots) are usually composed of multiple building elements of a relatively small repertoire, with uniform docking interfaces that allow transfer of mechanical forces and moments, electrical power and communication throughout the modular devices. Modular devices are designed with parts that can be reconfigured to assume different shapes and functions. Self-reconfiguring devices have the ability to adapt to the operating environment and the required functionality by changing shape.

Each building element of some modular devices has an identification (ID) number, and can be identified according to the ID number. The ID number is pre-stored in each building element. These modular devices need to be assembled together according to a fixed order. If one or more building elements are put in a wrong position, the modular device cannot work normally.

It is thus useful and desirable to provide an ID number setting method and a modular device to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 1:
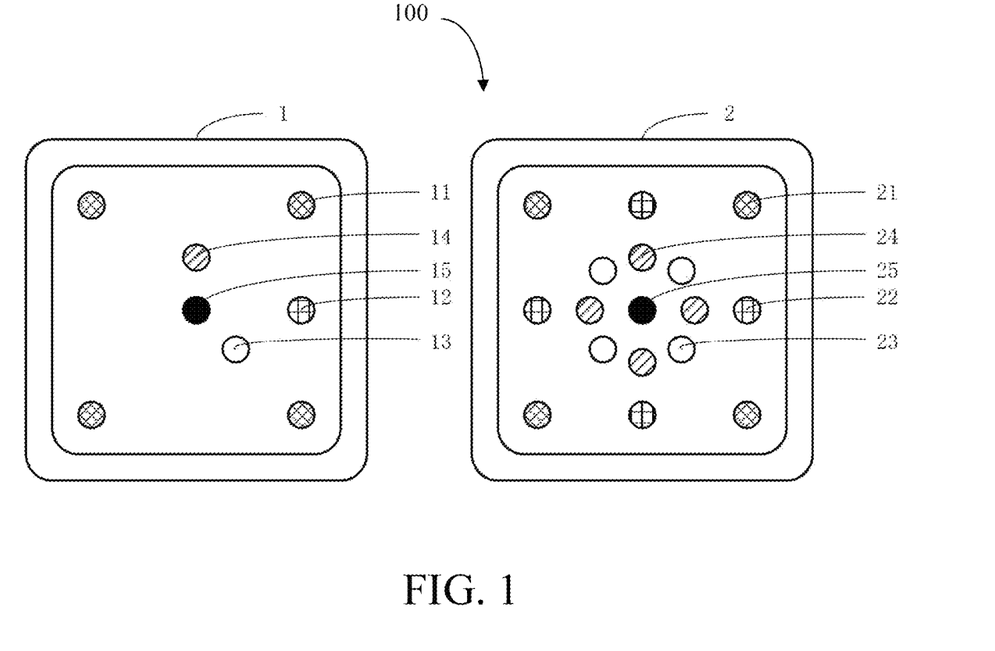
FIG. 1 is a schematic planar view showing the mating surfaces of one first type connector and on second type connector according to one embodiment.

Referring to FIG. 1, in one embodiment, a building element 100 is polyhedral and includes one first type connector 1 and L second connectors 2 on different side surfaces of the building element 100, where L is a natural number greater than or equal to 1.

The first type connector 1 includes M first magnets 11, a first ground terminal 12, a first detection terminal 13, a first power terminal 14, and a first signal terminal 15. Each second type connector 2 includes M second magnets 21 that are magnetically attractable to the first magnets 11, N second ground terminals 22, O second detection terminals 23, P second power terminals 24, and a second signal terminal 25, where M, N, O, and P are natural numbers and at least one of them is greater than 1.

When the first type connector 1 one building element 100 is mechanically connected to one second type connector 2 of another building element 100 by the engagement of the first magnets 11 with the second magnets 21, the first ground terminal 12, the first detection terminal 13, the first power terminal 14 and the first signal terminal 15 of the first type connector 1 respectively come into contact with one of the second ground terminals 22, one of the second detection terminals 23, one of the second power terminals 24, and the second signal terminal 25 of the second type connector 2.

The first type connector 1 may be a male connector, and the second type connectors 2 may be female connectors that can be mated with the male connector. The numbers L, M, N, O, and P can change according to actual needs. The arrangement of the first magnets 11, the second magnets 21, and the various terminals can change according to actual needs, on the condition that the first magnets 11 can be respectively attracted to the second magnets 21, and that the first ground terminal 12, the first detection terminal 13, the first power terminal 14 and the first signal terminal 15 respectively come into contact with one of the second ground terminals 22, one of the second detection terminals 23, one of the second power terminals 24, and the second signal terminal 25.

Each building element 100 can be a tetrahedron, a cube, or an octahedron. Building elements 100 in the form of different polyhedrons may include first type connectors that have the same or different configuration, and include second type connectors that have the same or different configuration, on the condition that the first magnets 11 can be respectively attracted to the second magnets 21, and that the first ground terminal 12, the first detection terminal 13, the first power terminal 14 and the first signal terminal 15 respectively come into contact with one of the second ground terminals 22, one of the second detection terminals 23, one of the second power terminals 24, and the second signal terminal 25.

FIG. 1 shows a planar view of one first type connector 1 and one second type connector 2, both of which have a square contour. In one embodiment, the numbers M, N, O, and P are all four. The four first magnets 11 are evenly arranged adjacent to four corners of the first type connector 1. The first ground terminal 12 is arranged between two adjacent ones of the four first magnets 11. The first signal terminal 15 is arranged between two of the four first magnets 11, which are located on a diagonal of an imaginary rectangle formed by the four first magnets 11. The first detection terminal 13 is arranged between the signal terminal 15 and one of the first magnets 11. The power terminal 14 is arranged within a first triangular area defined by the two of the first magnets 11 and the first signal terminal 15, and the first signal terminal 15 is located at a center of a square defined by the four first magnets 11.

The four second magnets 21 are evenly arranged adjacent to four corners of each second type connector 2. Each second ground terminal 22 is arranged between two adjacent ones of the second magnets 21. The second signal terminal 25 is arranged between two of the four second magnets 21, which are located on a diagonal of an imaginary rectangle formed by the four second magnets 21. Each second detection terminals 23 is arranged between the second signal terminal 25 and one of the second magnets 21. Each second power terminal 24 is arranged within one second triangular area defined by the second signal terminal 25 and two adjacent ones of the four second magnets 21. Rectangles defined by the four second magnets 21, by the four second ground terminals 22, by the four second detection terminals 23, and by the four power terminals 24 share a same center and the second signal terminal 25 is located at the center of the four rectangles.

As shown in FIG. 1, areas with the same filling represent the same component. The magnets and terminals described above are schematically to have circular cross sections. However, the size and the shape of the magnets and terminals described above can change according to actual needs.

Figure 2:
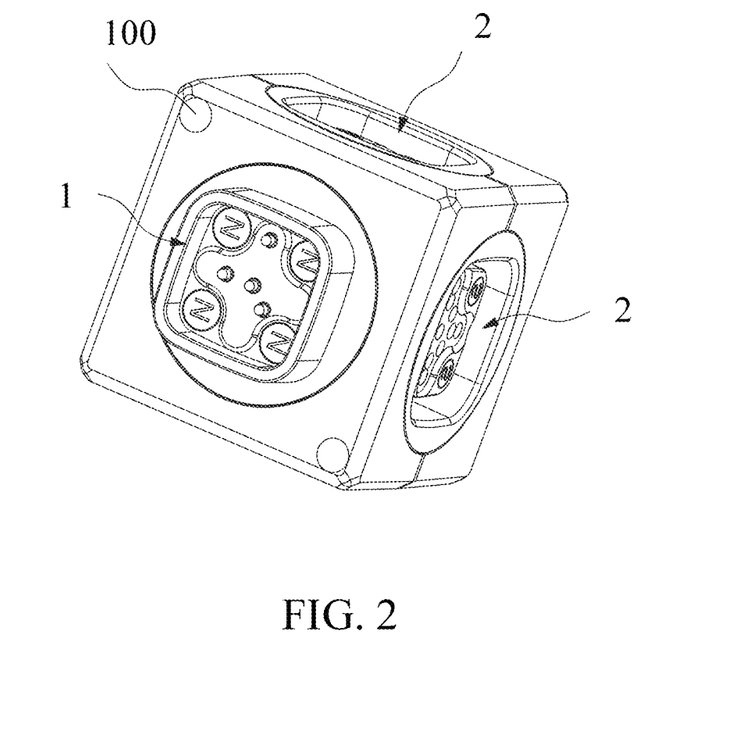
FIG. 2 is a schematic isometric view of a building element according to one embodiment.

Referring to FIG. 2, in one embodiment, the building element 100 is a cube. The number L equals to five, and the numbers M, N, O, and P all equal to four. One first type connector and five second type connectors are respectively disposed on the six side surfaces of the building element 100.

Figure 3:
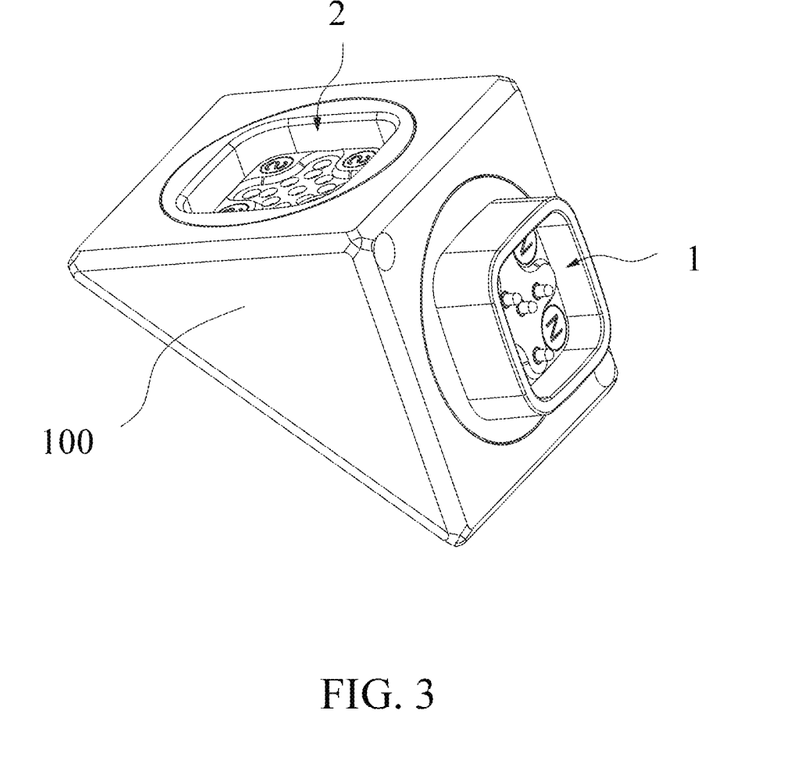
FIG. 3 is a schematic isometric view of a building element according to another embodiment.

Referring to FIG. 3, in one embodiment, the building element 100 may be a tetrahedron. The number L equals to three, and the numbers M, N, O, and P all equal to four. One first type connector and five second type connectors are respectively disposed on the four side surfaces of the building element 100.

Figure 4:
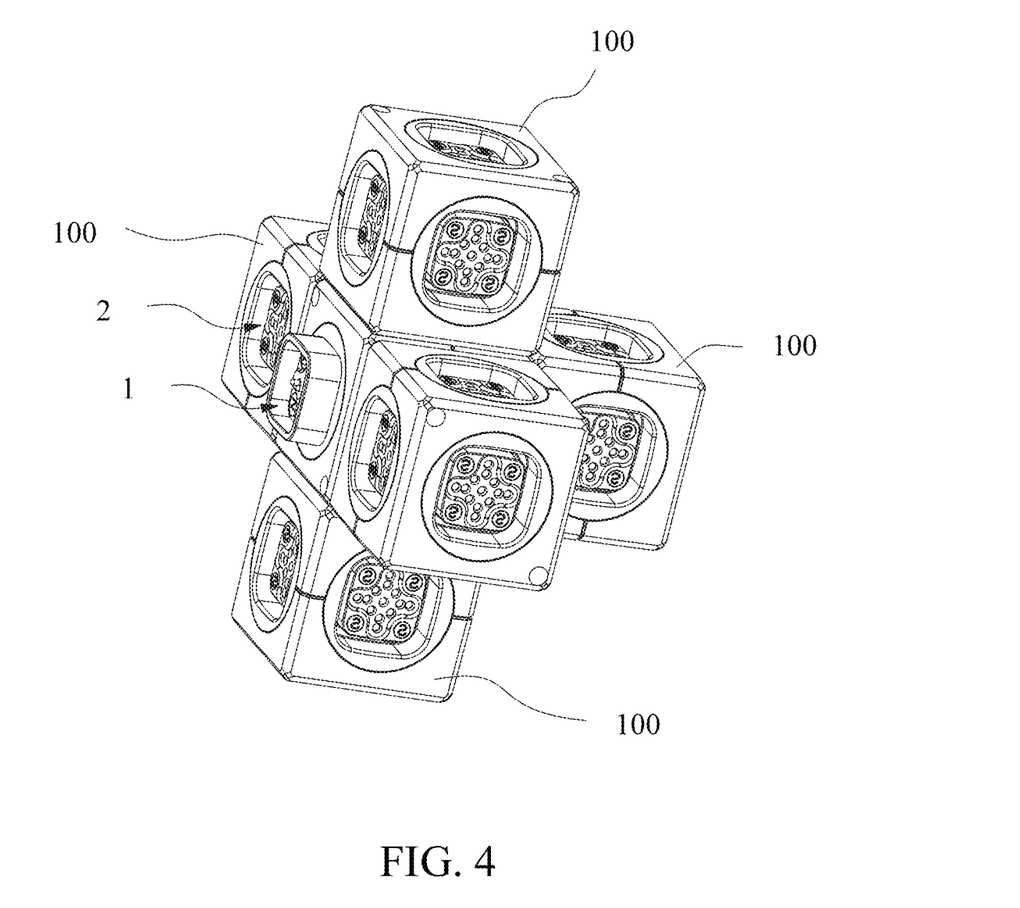
FIG. 4 is schematic isometric view of an assembly including a number of building elements that are connected to one another.

FIG. 4 shows that five building elements 100 are connected to five side surfaces of on building element 100 by the engagement of first type connectors 1 and second type connectors.

Figure 5:
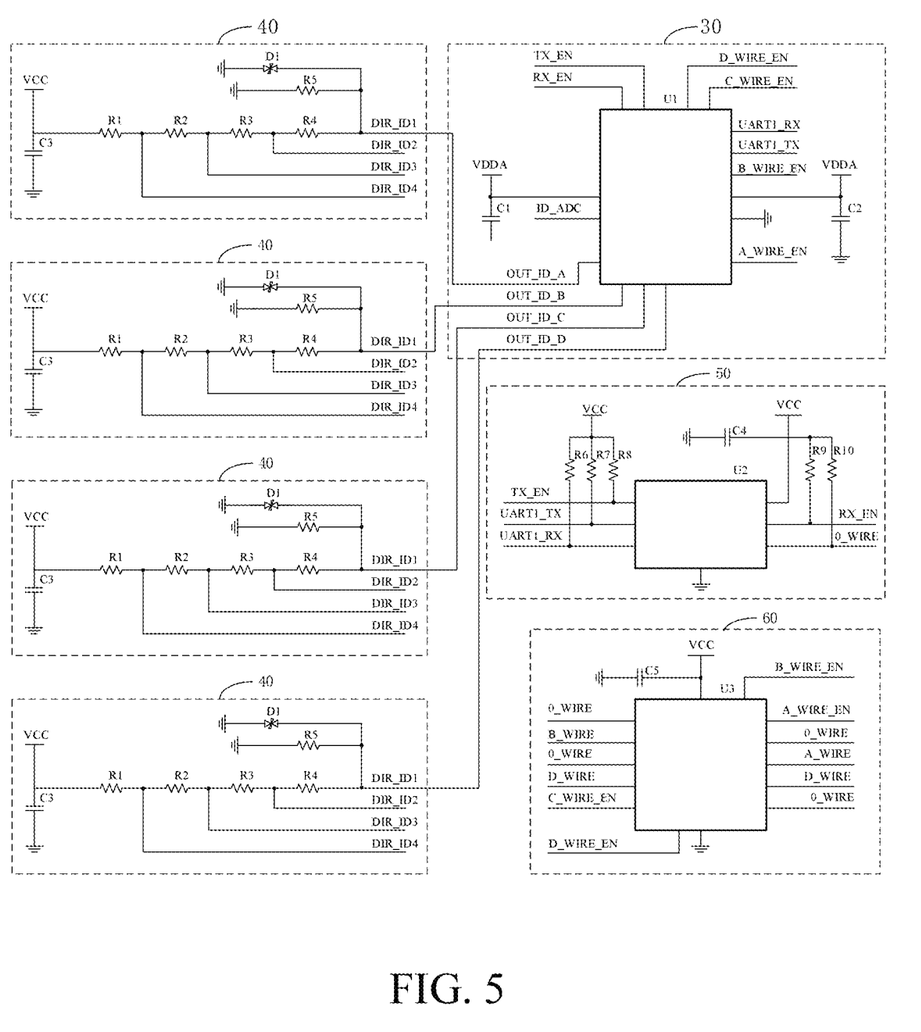
FIG. 5 is a schematic circuit diagram of a building element according to one embodiment.

Referring to FIG. 5, in one embodiment, the first type connector 1 further includes a first detection circuit 30, and each second type connector 2 includes a second detection circuit 40. In the embodiment as shown in FIG. 5, the number L is equal to four. The circuit diagrams of the second detection circuits 40 are shown in FIG. 5.

As shown in FIG. 5, in one embodiment, the first detection circuit 30 of one building element includes a first control module U1 that includes a first power pin electrically connected to a power supply VDDA, an orientation detection pin ID_ADC electrically connected to the first detection terminal 13 of the first type connector 1, a signal input pin UART1_RX and a signal output pin UART1_TX that are connected to the first signal terminal 15 of the first type connector 1 and the second signal terminals 25 of the building element, a first ground pin that is grounded, and L voltage detection pins.

In the embodiment as shown in FIG. 5, the number L is equal to four, and the first detection circuit 30 includes four voltage detection pins OUT_ID_A, OUT_ID_B, OUT_ID_C, and OUT_ID_D.

As shown in FIG. 5, in one embodiment, the second detection circuit 40 includes Q first voltage dividing resistors connected successively. A first of the first voltage dividing resistors is connected to the power supply VCC, and a last of the first voltage dividing resistors is grounded. O detection orientation terminals are respectively connected to O nodes between O pairs of adjacent ones of the first voltage dividing resistors, and the O orientation detection terminals are respectively connected to the O second detection terminals of one corresponding second type connector, where Q is greater than O. Each of the O orientation detection terminals is connected to one of the L voltage detection pins.

In one embodiment as shown in FIG. 5, L equals to four, O equals to four, and Q equals to five. The second detection circuit 40 includes five first voltage dividing resistors R1 through R5 connected to one another successively. A first of the first voltage dividing resistor R1 is connected to the power supply, and a last voltage dividing resistor R5 is grounded. Four detection terminals DIR_ID1, DIR_ID2, DIR_ID3 and DIR_ID4 are respectively connected to four nodes between four pairs of adjacent first voltage dividing resistors (e.g., resistors R1 and R2, R2 and R3, R3 and R4, and R4 and R5). The four detection terminals are respectively connected to the four second detection terminals of the second type connector 2. One of the detection terminals DIR_ID1, DIR_ID2, DIR_ID3 and DIR_ID4 is connected to one of the four voltage detection pins OUT_ID_A, OUT_ID_B, OUT_ID_C, and OUT_ID_D.

FIG. 5 shows that the four voltage detection pins OUT_ID_A, OUT_ID_B, OUT_ID_C, and OUT_ID_D are connected to the detection terminals DIR_ID1 of four second detection circuits 40.

The working principles of the first detection circuit 30 and the second detection circuit 40 are as follows: When one first type connector 1 of a building element is engaged with one second type connector 2 of another building element, the first control module U1 determines the orientation of one of the second detection terminals 23 of the second type connector 2, which is in contact with the first detection terminal 13 of the first type connector 1, according to a voltage value of the orientation detection pin ID_ADC of the first control module U1. The first control module U1 further sets the orientation detection pin ID_ADC to be in an output mode and controls the orientation detection pin ID_ADC to output a low-level voltage.

When the first control module U1 detects that one of the four voltage detection pins OUT_ID_A, OUT_ID_B, OUT_ID_C, and OUT_ID_D is at low level, it is determined that the second type connector 2 corresponding to the low-level detection pin is connected to the first type connector 1. When the first control module U1 detects that one of the four voltage detection pins OUT_ID_A, OUT_ID_B, OUT_ID_C, and OUT_ID_D is at high level, it is determined that the second type connector 2 corresponding to the high-level detection pin is not connected to the first type connector 1.

It should be noted that the numbers O and Q can change according to actual needs on the condition that Q is greater than O and that O orientation detection terminals are respectively connected to O nodes between O pairs of adjacent ones of the first voltage dividing resistors. Since the O orientation detection terminals are respectively connected to the O second detection terminals of one corresponding second type connector, when one first type connector 1 is engaged with one second type connector 2, causing one second detection terminal 23 of the second type connector 2 to be in contact with the first detection terminal 13 of the first type connector 1, the voltage of the detection pin ID_ADC of the first control module U1 can be detected. Since different detection terminals of the second type connector are connected to different orientation detection terminals of the second detection circuit, and the orientation detection terminals are respectively connected to O nodes between O pairs of adjacent ones of the first voltage dividing resistors, the voltage of the orientation detection pin of the control module U1 is different when different second detection terminal 23 is in contact with the first detection terminal 13. Therefore, according to the voltage detected by the orientation detection pin of the control module U1, it can determine which second detection terminal 23 of the second type connector 2 is in contact with the first detection terminal 13 of the first type connector 1. As a result, it can determine the orientation of the second detection terminal 23 of the second type connector 2 that is in contact with the first detection terminal 13 of the first type connector 1.

In one embodiment, the first control module U1 may include a processor. The processor may be a central processing unit (CPU), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like.

As shown in FIG. 5, in one embodiment, the first detection circuit 30 further includes at least one first bypass capacitor that is connected between the first power pin VDDA and the first ground pin of the first control module U1. The second detection circuit further includes at least one second bypass capacitor that is connected between the first voltage dividing resistor R1 and ground, and a voltage stabilizing diode D1 that is connected between the last voltage dividing resistor R5 and ground.

The number and capacitance of the first bypass capacitors and the second bypass capacitors can be determined according to actual needs. For example, as shown in FIG. 5, the first detection circuit 30 may include two first bypass capacitors C1 and C2. The first bypass capacitor C1 is connected between the first power pin VDDA of the first control module U1 and ground, and the second bypass capacitor C2 is connected to the power supply of the control module U1. The second detection circuit 40 may include one second bypass capacitors C3.

As shown in FIG. 5, in one embodiment, the building element 100 further includes a gating circuit 50 and an electronic switching circuit 60. The gating circuit 50 includes a gating module U2 that includes a ground pin that is grounded, a power pin that is connected to the power supply VCC, a signal input pin UART1_RX that is connected to the signal input pin UART1_RX of the first control module U1, a signal output pin UART1_TX that is connected to the signal output pin UART1_TX of the first control module U1, a signal input controlled pin RX_EN, a signal output controlled pin TX_EN, and a number of gating pins 0_WIER.

The electronic switching circuit 60 may include an electronic switching module U3 that includes a ground pin that is grounded, a power pin that is connected to the power supply VCC, L signal pins that are respectively connected to signal terminals of the L second type connectors, L gating pins that are connected to the gating pins 0_WIER of the gating module U2, and L gating signal pins.

The first control module U1 further includes a signal input control pin RX_EN connected to the signal input controlled pin RX_EN of the gating module U2, a signal output control pin TX_EN connected to the signal output controlled pin TX_EN of the gating module U2, and L gating signal pins that are respectively connected to the L gating signal pins of the electronic switching circuit U3.

In the embodiment as shown in FIG. 5, the number L is equal to four, and the electronic switching module U3 includes four gating pins 0_WIER and four signal pins A_WIRE, B_WIRE, C_WIRE, and D_WIRE. The first control module U1 includes four gating signal pins A_WIRE_EN, B_WIRE_EN, C_WIRE_EN, and D_WIRE_EN.

In one embodiment, the first control module U1 is configured to: enable/disable the signal input pin UART1_RX of the gating module U2 through the signal input control pin RX_EN, enable/disable the signal output pin UART1_TX of the gating module U2 through the signal output control pin TX_EN, enable/disable the four signal pins A_WIRE, B_WIRE, C_WIRE, and D_WIRE of the electronic switching module U3 through the four gating signal pins A_WIRE_EN, B_WIRE_EN, C_WIRE_EN, and D_WIRE_EN of the first control module U1, and control the gating module U2 to select one of the signal pins of one second type connector to output signals through the gating pins of the electronic switching module U3.

The gating module can be implemented by any suitable chip, circuit or device with the above-mentioned gating function, and the electronic switch module be any chip, circuit or device including an electronic switching transistor and having the above-mentioned switching function.

As shown in FIG. 5, in one embodiment, the gating circuit 50 further includes at least five second voltage dividing resistors and at least one third bypass capacitor. The signal input pin UART1_RX, the signal output pin UART1_TX, the signal input controlled pin RX_EN, the signal output controlled pin TX_EN, and the gating pin 0_WIER of the gating module U2 are respectively connected to the power supply VCC through at least one of the at least five second voltage dividing resistors. The at least one third bypass capacitor is connected between the power pin of the gating module U2 and ground. The electronic switching circuit 60 further comprises at least one fourth bypass capacitor that is connected between the power pin of the electronic switching module and ground.

It should be noted that the number and capacitance of the second voltage dividing resistors, the third bypass capacitor, and the fourth bypass capacitor can change according to actual needs.

In the embodiment as shown in FIG. 5, the gating circuit 50 includes five second voltage dividing resistors R6 through R10 and one third bypass capacitor C4. The signal input pin UART1_RX, the signal output pin UART1_TX, the signal input controlled pin RX_EN, the signal output controlled pin TX_EN, and the gating pin 0_WIER of the gating module U2 are respectively connected to the power supply VCC through the five second voltage dividing resistors R6 through R10. The electronic switching circuit 60 includes one fourth bypass capacitor C5.

Figure 6:
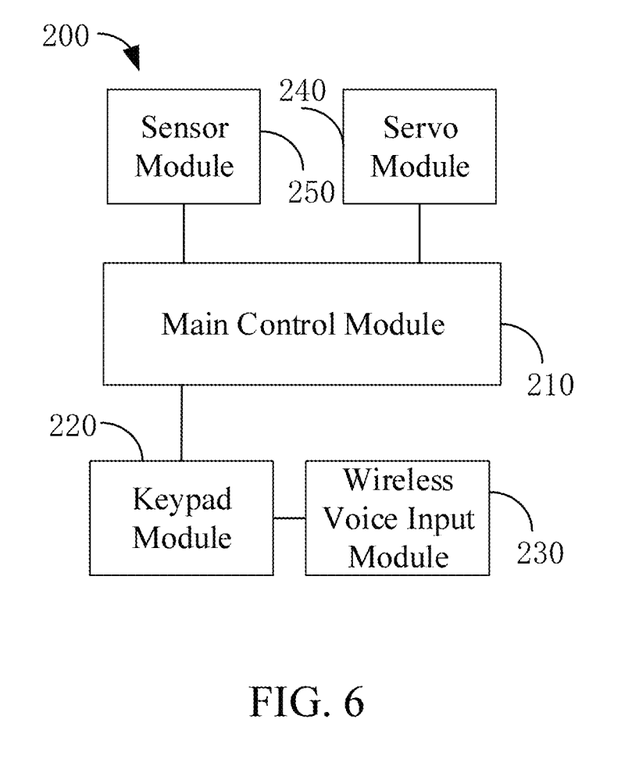
FIG. 6 is a schematic block diagram of a robot according to one embodiment.

Referring to FGI. 6, in one embodiment, a robot 200 may include a number of building elements 100 that are connected to one another by engagement of first type connectors 1 and second type connectors 2. For example, the robot 200 may include a main control module 210, a keypad module 220, a wireless voice input module 230, at least one servo 240, and at least one sensor module 250 that each are in the form of a building element. The main control module 210 is magnetically connected to each of the at least one servo 240, the at least one sensor module 250, and the keypad module 220, in a manner similar to the manner in which two building elements 100 are connected to each other. The keypad module 220 is magnetically connected to the wireless voice input module 230.

In on embodiment, the main control module 210 is configured to set a unique ID number to each of the at least one servo 240, the at least one sensor module 250, the keypad module 220, and the wireless voice input module 230, in the order in which these components are connected to the main control module 210. The main control module 210 is configured to obtain connection state of each of these components, which includes successful connection of one first type connector with one second type connector, failed connection of one first type connector with one second type connector, and the orientation of one second detection terminal of one second type connector, which is in contact with the detection terminal of one first type connector.

The keypad module 220 is configured to: receive and process read/write commands sent by the main control module 210, enable/disable the signal input pins and signal output pins of the second type connectors of the main control module 210, display the connection state of the components connected to the main control module 210, and receive control commands from a user and send the control commands to the main control module 210.

The wireless voice input module 230 is configured to collect and identify voice commands, and send the voice recognition results to the main control module 210 and a client device through the keypad module 220.

The main control module 210 is further configured to control operation of the components connected to the main control module 210 according to the control commands/voice recognition results, and send the connection state and operation results to the client device through the wireless voice input module 230.

In one embodiment, the main control module 210 may include a processor. The processor may be a central processing unit (CPU), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like.

The sensor module 250 can be any type of sensor according to actual needs, such as a distance sensor, a temperature sensor, a humidity sensor, a smoke sensor, a light sensor, infrared sensor, etc. The keypad module 220 may be a touch display with physical or touch keys. The wireless voice input module 230 may be any type of voice input device that has wireless communication abilities such as Bluetooth, WiFi, and ZigBee, as well as voice collection, recognition, and playback functions. The client may be a mobile phone, a tablet computer, a cloud server, a smart band, a notebook computer, a personal digital assistant and the like.

The building element of the present disclosure can be applied in various types of robots, such as modular robots. The robots may be created by connecting the at least one servo, the at least one sensor module, the keypad module, and the wireless voice input module to the main control module. The components can provide various functions, such as charging interface between the robots and fixed power outlet.

In one embodiment, a modular device includes a number of building elements as described above. The number of the building elements is not limited and can change according to actual needs. Each of the building elements may include one or more first type connectors 1 and/or one or more second type connectors 2. The building elements may have the same configuration. For example, all the building elements may be building elements as shown in FIG. 2. The building elements may have different configuration. For example, some of the building elements are the building elements as shown in FIG. 2, and some of the building elements are the building elements as shown in FIG. 3.

Figure 7:
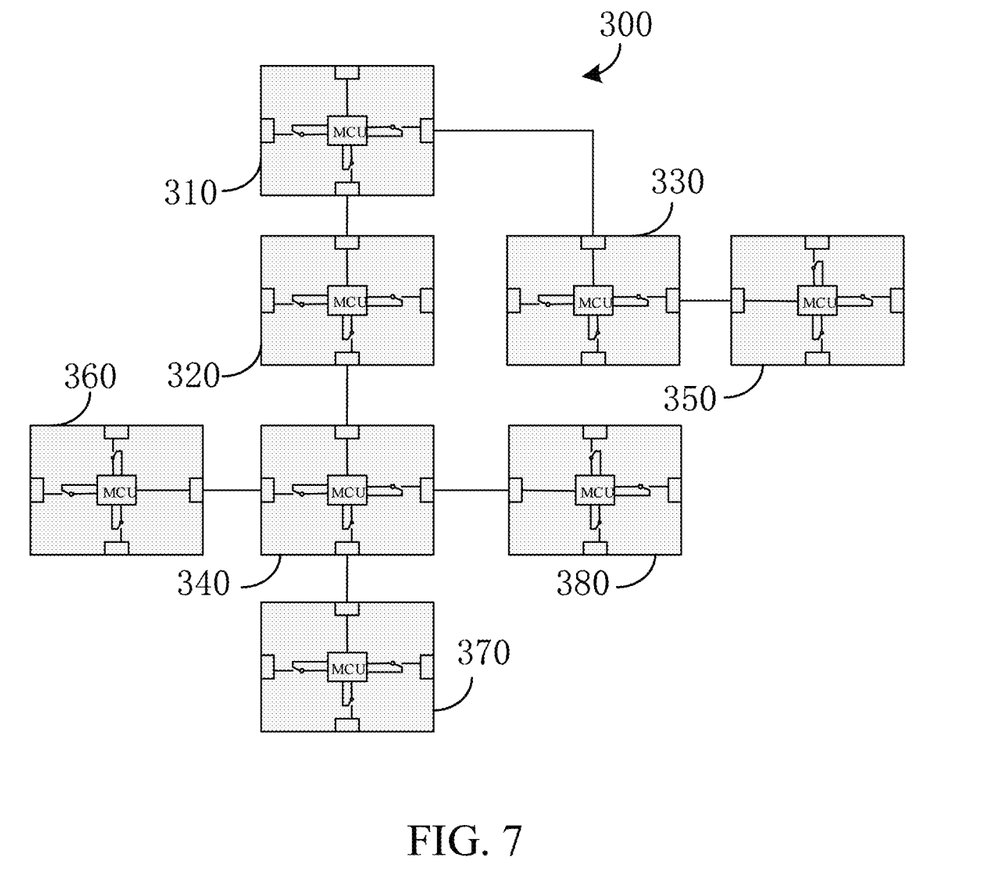
FIG. 7 is a schematic block diagram of a modular device according to one embodiment.
Figure 8:
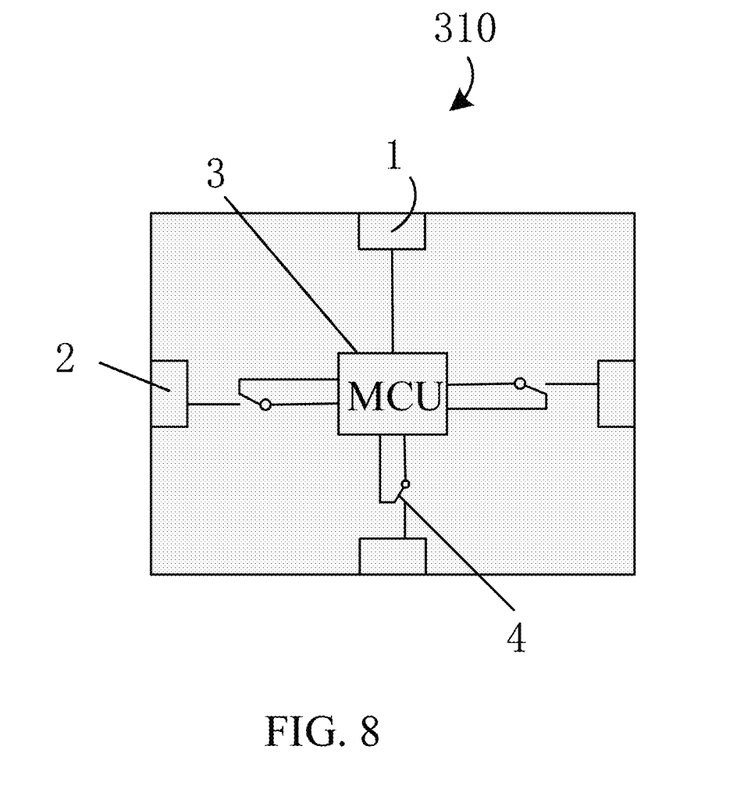
FIG. 8 is a schematic block diagram of a building element of the modular device of FIG. 7.

Descriptions are now made by taking FIG. 7 as an example. In the example as shown in FIG. 7, a modular device 300 includes eight building elements 310 through 380 that may have the same configuration. For example, in an example as shown in FIG. 8, each of the building elements 310 through 380 may include one first type connector 1 (also referred to as "input interface") and three second type connectors 2 (also referred to as "output interfaces"). Each of the building elements 310 through 380 may further include a micro controller unit (MCU) 3 and three switches 4. The input interface is directly connected to the MCU 3, and each output interface is electrically connected to the MCU 3 via one switch 4. The three switches can be controlled to turn on/off by the MCU 3. It should be noted that the number of the switches 4 can change according to actual needs. For example, when each of the building elements 310 through 380 is a building element as shown in FIG. 2, which has 5 output interfaces, the number of the switches 4 is five.

It should be noted that the MCU of each of the building elements 310 through 380 may be replaced by a central processing unit (CPU), a general purpose processor, a digital signal processor (DSP), an application specific integrated circuit (ASIC), a field-programmable gate array (FPGA), a programmable logic device, a discrete gate, a transistor logic device, a discrete hardware component, or a combination of some of or all of these components. The general purpose processor may be a microprocessor or any conventional processor or the like.

Each of the building elements 310 through 380 can further include a storage to store a unique ID number. The storage can be selected from one of the group of a flash memory, a buffer, and an electrically erasable programmable read-only memory (EEPROM). The storage can further store computer programs, other programs, and data. When the computer programs stored in building elements 310 are executed, the steps in the embodiments of the method for setting identification numbers for the building elements, such as steps S101 through S103 in FIG. 9. The storage can also be used to temporarily store data that have been output or is about to be output.

In one embodiment, the building element 310 is master building element (hereinafter "master building element 310") and the building elements 320 through 380 (hereinafter "slave building elements 320-380") are directly/indirectly connected to the master building element 310. Specifically, the slave building elements 320 and 330 are directly connected to two output interfaces (hereinafter "first output interface and second output interface") of the master building element 310. The slave building elements 340 and 350 are respectively connected to output interfaces the slave building elements 320 and 330. The slave building elements 360, 370, and 380 are respectively connected to three output interfaces of the slave building element 340.

Figure 9:
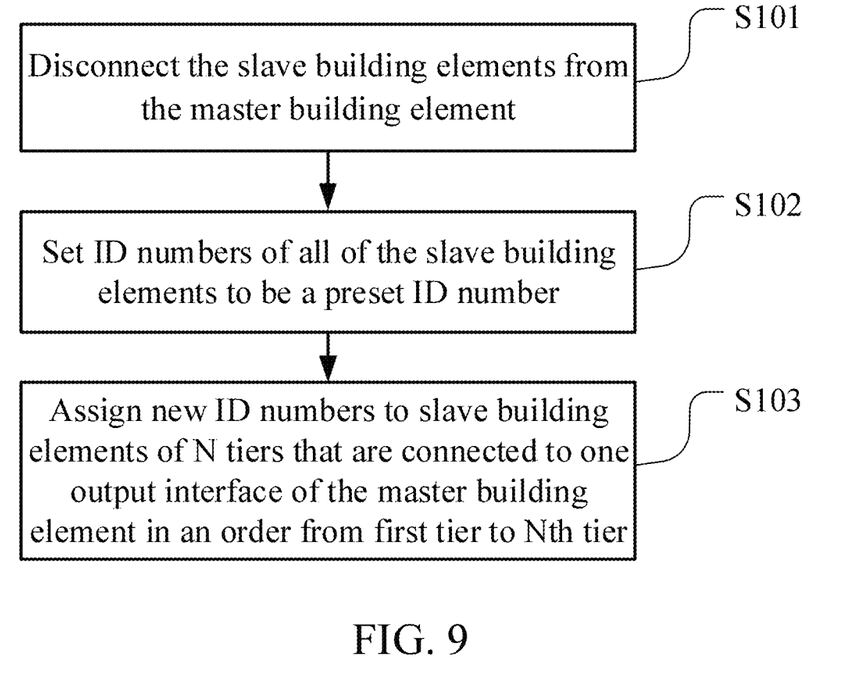
FIG. 9 is a schematic flowchart of an identification number setting method for a modular device according to one embodiment.

FIG. 9 shows an exemplary flowchart of an identification (ID) number setting method that is implemented by the modular device described above. The method may include the following steps.

Step S101: Disconnect the slave building elements from the master building element. In the embodiment, after the master building element 310 and the slave building elements 320-380 have been connected together, the master building element 310 can set a unique ID number for each of the slave building elements 320-380. First, the MCU of the master building element 310 disconnects all the slave building elements 320-380 that are directly or indirectly connected to the first output interface and the second output interface of the master building element 310. The MCU of the master building element 310 may broadcast a command, which indicates disconnection of the slave building elements 320-380 from the master building element 310, to all the slave building elements 320-380. The command can be transmitted according to Inter-Integrated Circuit (I²C) protocol or Universal Asynchronous Receiver and Transmitter (UART) protocol. The MCUs of the building elements 310-380 then control corresponding switches in an OFF state so as to disconnect the output interfaces of the building elements 310-380 from the MCUs of the building elements 310-380. The connection between the master building element 310 and the slave building elements 320-380 is then cut off. In this state, the commands broadcasted by the MCU of the master building element 310 cannot be transmitted to the slave building elements 320-380.

Step S102: Set ID numbers of all of the slave building elements to be a preset ID number. In one embodiment, after receipt of the command broadcasted by the master building element 310, the MCUs of the slave building elements 320-380 may respectively set the ID numbers of the slave building elements 320-380 to be a preset ID number (e.g., 0x00).

Step S103: Assign new ID numbers to slave building elements of N tiers that are connected to one output interface of the master building element in an order from first tier to Nth tier, wherein the slave building elements of the first tier are slave building elements that are directly connected to the output interface, the slave building elements of the Nth tier are slave building elements that are indirectly connected to the output interface through slave building elements of a (N−1)th tier, N is a natural number greater than 1.

In one embodiment, the MCU of the master building element 310 may first assign new ID numbers to the slave building elements that are directly/indirectly connected to the first output interface of the master building element 310, and then assign new ID numbers to the slave building elements that are directly/indirectly connected to the second output interface of the master building element 310. However, this is not limited and the order in which the new ID numbers are assigned to the slave building elements that are connected to different output interfaces of the master building element can change according to actual needs.

For the slave building elements that are connected to each output interface of the master building element 310, new ID numbers can be assigned according to step S103. Specifically, the MCU of the master building element 310 first controls one switch between the MCU of the master building element 310 and the first output interface to be in an "ON" state, so as to resume connection of the slave building element 320 to the master building element 310. At the moment, only one slave building element (i.e., the building element 320) having the preset ID number (i.e., 0x00) can communicate with the master building element 310. The MCU of the master building element 310 then sends a device information acquiring command to the slave building element 320 to acquire device type and connection information of the slave building element 320. In one embodiment, the device information acquiring command may have an identification number of 0x00 that is sent to the building element having the ID number of 0x00. Sine only the building element 320 has the ID number of 0x00 at the moment, the MCU of the building element 320 sends back the device type and connection information of the slave building element 320 to the MCU of the master building element 310. The device type is used to indicate the type of a building element. In one embodiment, FIG. 2 shows a first type of a building element, and FIG. 3 shows a second type of a building element. The connection information is used to describe the slaver building elements connected to the slave building element 320. In one embodiment, based on the device type, the MCU of the master building element 310 can assign a new ID number (e.g., 0x01) to the slave building element 320. The ID number of 0x01 means that the slave building element 320 is the first building element of its type that is assigned with a new ID number. In this case, building elements of different types may have the same ID number. In another embodiment, the MCU of the master building element 310 can assign a new ID number to each slave building element without considering the device type.

In the embodiment, the slave building element 320 that is directly connected to the first output interface of the master building element 310 is also referred to as the salve building element of the first tier. After the new ID number has been assigned to the salve building element of the first tier, the MCU of the master building element 310 then assigns new ID numbers to the building elements of the second tier, that is, the building elements that are indirectly connected to the first output interface of the master building element 310 through the salve building element of the first tier.

Specifically, according to the connection information of the slave building element 320, the MCU of the master building element 310 can determine that there is one slave building element (i.e., slave building element 340) connected to one output interface of the slave building element 320. The MCU of the master building element 310 then sends a command to the slave building element 320 so as to control the switch between the output interface of the slave building element 320 and the slave building element 340 to be in an "ON" state. The slave building element 340 then resumes connection with the master building element 310 through the slave building element 320. The MCU of the master building element 310 then sends a device information acquiring command to the slave building element 340 to acquire device type and connection information of the slave building element 340. The MCU of the master building element 310 can then assign a new ID number (e.g., 0x02) to the slave building element 340.

According to the connection information of the slave building element 340, the MCU of the master building element 310 can determine that there are three slave building elements (i.e., slave building elements 360, 370 and 380) connected to three output interfaces of the slave building element 340. After the new ID numbers have been assigned to the salve building element of the second tier, the MCU of the master building element 310 then assigns new ID numbers to the building elements of the third tier, i.e., the slave building elements 360, 370 and 380. Specifically, the MCU of the master building element 310 first resumes connection of the lave building element 360 with the building element 340, and sends a device information acquiring command to the slave building element 360 to acquire device type and connection information of the slave building element 360. The MCU of the master building element 310 may assign a new ID number (e.g., 0x03) to the slave building element 360. Similar operations are then performed to assign a new ID number (e.g., 0x04) to the slave building element 370. Finally, similar operations are performed again to assign a new ID number (e.g., 0x05) to the slave building element 380. Based on the connection information of the slave building elements 360, 370 and 380, the MCU of the master building element 310 can determine that there are no slave building elements of the fourth tier that are connected to the first output interface of the master building element 310. It should be noted that the ID numbers of the building elements of the third tier may be assigned in a different order according to actual needs. Steps S101-103 are then performed again to set ID numbers for the building elements (i.e., building elements 330 and 350) that are directly/indirectly connected to the second output interface of the master building element 310.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented identification (ID) number setting method for a modular device that comprises a master building element and a plurality of slave building elements that are connected to the master building element, the method comprising:
   setting ID numbers of all of the slave building elements to be a preset ID number after disconnecting the slave building elements from the master building element, and
   assigning new ID numbers to slave building elements of N tiers that are connected to one output interface of the master building element in an order from first tier to Nth tier, wherein the slave building elements of the first tier are slave building elements that are directly connected to the output interface, the slave building elements of the Nth tier are slave building elements that are indirectly connected to the output interface through slave building elements of a (N−1)th tier, N is a natural number greater than 1;
   wherein each of the master building element and the slave building elements comprises a micro controller unit (MCU), and disconnecting the slave building elements from the master building element, comprises:
   broadcasting, by the MCU of the master building element, a command of disconnecting the slave building elements from the master building element, and
   disconnecting, by the MCUs of the master building element and the slave building elements, output interfaces of the master building element and the slave building elements from the MCUs of the master building element and the slave building elements.

2. The method according to claim 1, wherein the ID numbers of the building elements of each of the N tiers are assigned in a predefined order.

3. The method according to claim 1, wherein each of the master building element and the slave building elements comprises a switch between the MCU and each of the output interfaces thereof, the ICUs of the master building element and the slave building elements are configured to control the switches to be in an OFF state to disconnect the slave building elements from the MCUs of the master building element and the slave building, elements.

4. The method according to claim 1, wherein each of the master building element and the slave building elements comprises:
   a first type connector comprising M first magnets, a first ground terminal, a first detection terminal, a first power terminal, and a first signal terminal;
   L second type connectors, each of the second type connectors comprising M second magnets that are magnetically attractable to the first magnets, N second ground terminals, O second detection terminals, P second power terminals, and a second signal terminal, where M, N, O, and P are natural numbers and at least one of M, N, O, and P is greater than 1;
   wherein when the first type connector of a first of the master building element and the slave building elements is mechanically connected to one of the second type connectors of a second of the master building element and the slave building elements by the first magnets and the second magnets thereof, the first ground terminal, the first detection terminal, the first power terminal and the first signal terminal of the first type connector of the first of the master building element and the slave building elements come into contact with one of the second ground terminals, one of the second detection terminals, one of the second power terminals, and the second signal terminal of the second type connector of the second of the master building element and the slave building elements.

5. The method according to claim 4, Wherein each of the master building element and the slave building elements is a cube, L is equal to five, the first type connector and the second type connectors are disposed on six side surfaces of each of the master building element and the slave building elements.

6. The method according to claim 4, wherein M, N, 0 and P are all equal to four, the first magnets are evenly arranged adjacent to four corners of the first type connector, the first around terminal arranged between two adjacent ones of the four first magnets, the first signal is terminal is arranged between two of the four first magnets that are located on a diagonal of an imaginary rectangle formed by the four first magnets, the first detection terminal is arranged between the first signal terminal and one of the first magnets, the first power terminal is arranged within a first triangular area defined by the two of the first magnets and the first signal terminal, and the first signal terminal is located at a center of a square defined by the four first magnets;

the second magnets are evenly arranged adjacent to four corners of each second type connector, each of the four second ground terminals is arranged between two adjacent ones of the second magnets, the second signal terminal is arranged between two of the four second magnets, which are located on a diagonal of an imaginary rectangle formed by the four second magnets, each of the four second detection terminals is arranged between the second signal terminal and a corresponding one of the second magnets, each of the four second power terminals is arranged within one second triangular area defined by the second signal terminal and two adjacent ones of the four second magnets, rectangles defined by the four second magnets, by the four second ground terminals, by the four second detection terminals, and by the four power terminals share a same center, and the second signal terminal is located at the center of the four rectangles.

7. The method according to claim 4, wherein the first type connector comprises a first detection circuit, and each of the second type connectors comprises a second detection circuit;

the first detection circuit comprises a first control module that comprises a first power pin electrically connected to a power supply, an orientation detection pin electrically connected to the first detection terminal of the first: type connector, a signal input pin and a signal output pin that are connected to the first signal terminal of the first type connector and the second signal terminals of the second type connectors, and a first ground pin that is grounded, and the first control module further comprises L voltage detection pins;

the second detection circuit comprises Q first voltage dividing resistors connected to one another successively, a first of the first voltage dividing resistors is connected to the power supply, and a last of the first voltage dividing resistors is grounded, O orientation detection terminals are respectively connected to O nodes between O pairs of adjacent ones of the first voltage dividing resistors, the O orientation detection terminals are respectively connected to the O second detection terminals of one corresponding second type connector, one of the O orientation detection terminals is connected to one of the L voltage detection pins of the first control module, and Q is greater than O;

when the first type connector of the first of the master building element and the slave building elements is engaged with one of the second type connectors of the second of the master building element and the slave building elements, the first control module is configured to determine an orientation of one of the second detection terminals of the one of the second type connectors, which is connected to the first detection terminal of the first type connector, according to a voltage value of the orientation detection pin of the first control module.

8. The method according to claim 7, wherein the first detection circuit further comprises at least one first bypass capacitor that is connected between the first power pin and the first ground pin of the first control module, the second detection circuit further comprises at least one second bypass capacitor that is connected between the first of the first voltage dividing resistors and ground, and a voltage stabilizing diode that is connected between the last of the first voltage dividing resistors and ground.

9. The method according to claim 7, wherein each of the master building element and the slave building elements comprises an electronic switching circuit and a gating circuit that comprises a gating module:

the gating module comprises a ground pin that is grounded, a power pin that is connected to the power supply, a signal input pin that is connected to the signal input pin of the first control module, a signal output pin that is connected to the signal output pin of the first control module, a signal input controlled pin, a signal output controlled pin, and a plurality of gating pins;

the electronic switching circuit comprises an electronic switching module, the electronic switching module comprises a ground pin that is grounded, a power pin that is connected to the power supply, L signal pins that are respectively connected to signal terminals of the second type connectors, L gating pins that are connected to the gating pins of the gating module, and L gating signal pins;

the first control module further comprises a signal input control pin connected to the signal input controlled pin of the gating module, a signal output control pin connected to the signal output controlled pin of the gating module, and L gating signal pins that: are respectively connected to the L gating signal pins of the electronic switching module;

the first control module is configured to: enable/disable the signal input pin of the gating module through the signal input control pin thereof, enable/disable the signal output pin of the gating module through the signal output control pin thereof, enable/disable L signal pins of the electronic switching module through the L gating signal pins of the first control module, and control the gating module to select an output signal from one of the signal pins of one of the second type connectors through the gating pins of the electronic switching module.

10. The method according to claim 9, wherein the gating circuit further comprises at least five second voltage dividing resistors and at least one third bypass capacitor, the signal input pin, the signal output pin, the signal input controlled pin, the signal output controlled pin, and the gating pins of the gating module are respectively connected to the power supply through at least one of the at least five second voltage dividing resistors; the at least one third bypass capacitor is connected between the power pin of the gating module and ground.

11. A modular device comprising:
a master building element;
a plurality of slave building elements;
one or more processors;
a memory; and
one or more programs, wherein the one or more programs are stored in the memory and configured to be executed by, the one or more processors, the one or more programs comprises:
instructions for setting ID numbers of all of the slave building elements to be a preset ID number after disconnecting the slave building elements from the master building element; and
instructions for assigning new ID numbers to slave building elements of N tiers that are connected to one output interface of the master building element in an order from first tier to Nth tier, wherein the slave building elements of the first tier are slave building elements that are directly connected to the output interface, the slave building elements of the Nth tier are slave building elements that are indirectly connected to the output interface through slave building elements of a (N−1)th tier, N is a natural number greater than 1;

wherein each of the master building element and the slave building elements comprises:

a first type connector comprising M first magnets, a first ground terminal, a first detection terminal, a first power terminal, and a first signal terminal;

L second type connectors, each of the second type connectors comprising Ni second magnets that are magnetically attractable to the first magnets, N second around terminals, O second detection terminals, P second power terminals, and a second signal terminal, where M, N, O, and P are natural numbers and at least one of M, N, O, and P is greater than 1;

wherein when the first type connector of a first of the master building element and the slave building elements is mechanically connected to one of the second type connectors of a second of the master building element and the slave building elements by the first magnets and the second magnets thereof, the first ground terminal, the first detection terminal, the first power terminal and the first signal terminal of the first type connector of the first of the master building element and the slave building elements come into contact with one of the second ground terminals, one of the second detection terminals, one of the second power terminals, and the second signal terminal of the second type connector of the second of the master building element and the slave building elements.

12. The modular device according to claim 11, wherein each of the master building element and the slave building elements is a cube, L is equal to five, the first type connector and the second type connectors are disposed on six side surfaces of each of the master building element and the slave building elements.

13. The modular device according to claim 11, wherein M, N, O and P are all equal to four, the first magnets are evenly arranged adjacent to four corners of the first type connector, the first ground terminal is arranged between two adjacent ones of the four first magnets, the first signal terminal is arranged between two of the four first magnets that are located on a diagonal of an imaginary rectangle formed by the four first magnets, the first detection terminal is arranged between the first signal terminal and one of the first magnets, the first power terminal is arranged within a first triangular area defined by the two of the first magnets and the first signal terminal, and the first signal terminal is located at a center of a square defined by the four first magnets;

the second magnets are evenly arranged adjacent to four corners of each second type connector, each of the four second ground terminals is arranged between two adjacent ones of the second magnets, the second signal terminal is arranged between two of the four second magnets, which are located on a diagonal of an imaginary rectangle formed by the four second magnets, each of the four second detection terminals is arranged between the second signal terminal and a corresponding one of the second magnets, each of the four second power terminals is arranged within one second triangular area defined by the second signal terminal and two adjacent ones of the four second magnets, rectangles defined by the four second magnets, by the four second ground terminals, by the four second detection terminals, and by the four power terminals share a same center, and the second signal terminal is located at the center of the four rectangles.

14. The modular device according to claim 11, wherein the first type connector comprises a first detection circuit, and each of the second type connectors comprises a second detection circuit;

the first detection circuit comprises a first control module that comprises a first power pin electrically connected to a power supply, an orientation detection pin electrically connected to the first detection terminal of the first type connector, a signal input pin and a signal output pin that are connected to the first signal terminal of the first type connector and the second signal terminals of the second type connectors, and a first ground pin that is grounded, and the first control module further comprises L voltage detection pins;

the second detection circuit comprises Q first voltage dividing resistors connected to one another successively, a first of the first voltage dividing resistors is connected to the power supply, and a last of the first voltage dividing resistors is grounded, O orientation detection terminals are respectively connected to O nodes between O pairs of adjacent ones of the first voltage dividing resistors, the O orientation detection terminals are respectively connected to the O second detection terminals of one corresponding second type connector, one of the O orientation detection terminals is connected to one of the L voltage detection pins of the first control module, and Q is greater than O;

when the first type connector of the first of the master building element and the slave building elements is engaged with one of the second type connectors of the second of the master building element and the slave building elements, the first control module is configured to determine an orientation of one of the second detection terminals of the one of the second type connectors, which is connected to the first detection terminal of the first type connector, according to a voltage value of the orientation detection pin of the first control module.

15. The modular device according to claim 14, wherein the first detection circuit further comprises at least one first bypass capacitor that is connected between the first power pin and the first ground pin of the first control module, the second detection circuit further comprises at least one second bypass capacitor that is connected between the first of the first voltage dividing resistors and ground, and a voltage stabilizing diode that is connected between the last of the first voltage dividing resistors and ground.

16. The modular device according to claim 14, wherein each of the master building element and the slave building elements comprises an electronic switching circuit and a gating circuit that comprises a gating module;

the gating module comprises a ground pin that is grounded, a power pin that is connected to the power supply, a signal input pin that is connected to the signal input pin of the first control module, a signal output pin that is connected to the signal output pin of the first control module, a signal input controlled pin, a signal output controlled pin, and a plurality of gating pins;

the electronic switching circuit comprises an electronic switching module, the electronic switching module comprises a ground pin that is grounded, a power pin that is connected to the power supply, L signal pins that are respectively connected to signal terminals of the second type connectors, L gating pins that are connected to the gating pins of the gating module, and L gating signal pins;

the first control module further comprises a signal input control pin connected to the signal input controlled pin of the gating module, a signal output control pin connected to the signal output controlled pin of the gating module, and L gating signal pins that are respectively connected to the L gating signal pins of the electronic switching module;

the first control module is configured to: enable/disable the signal input pin of the gating module through the signal input control pin thereof, enable/disable the signal output pin of the gating module through the signal output control pin thereof, enable/disable L signal pins of the electronic switching, module through the L gating signal pins of the first control module, and control the gating module to select an output signal from one of the signal pins of one of the second type connectors through the gating pins of the electronic switching module.

17. The modular device according to claim 16, wherein the gating circuit further comprises at least five second voltage dividing resistors and at least one third bypass capacitor, the signal input pin, the signal output pin, the signal input controlled pin, the signal output controlled pin, and the gating pins of the gating module are respectively connected to the power supply through at least one of the at least five second voltage dividing resistors; the at least one third bypass capacitor is connected between the power pin of the gating module and ground.

\* \* \* \* \*